United States Patent [19]
Evans

[11] 3,726,367
[45] Apr. 10, 1973

[54] COMBINED SERVICE AND PARKING BRAKE

[75] Inventor: Anthony C. Evans, Westland, Mich.

[73] Assignee: Kelsey-Hayes Company, Romulus, Mich.

[22] Filed: July 21, 1970

[21] Appl. No.: 56,921

[52] U.S. Cl.............188/106 P, 188/71.9, 188/170, 188/196 D
[51] Int. Cl............................................F16d 55/14
[58] Field of Search..................188/71.9, 106 R, 188/106 F, 106 P, 170, 196 D

[56] References Cited

UNITED STATES PATENTS

| | | | |
|---|---|---|---|
| 2,914,144 | 11/1959 | Hovell | 188/170 X |
| 3,378,109 | 4/1968 | Bauman | 188/71.9 |
| 3,410,373 | 11/1968 | Pace | 188/71.9 X |
| 3,543,888 | 12/1970 | Erdmann | 188/71.9 X |
| 3,547,233 | 12/1970 | Girvan | 188/170 |
| 2,342,750 | 2/1944 | Newell | 188/170 X |
| 3,599,761 | 8/1971 | Schultz | 188/170 |
| 3,647,030 | | Burnet | 188/170 |

Primary Examiner—Duane A. Reger
Attorney—Harness, Dickey & Pierce

[57] ABSTRACT

A disk brake assembly for a motor vehicle in which the friction pads are applied by a spring force in addition to being hydraulically actuated. A fluid pressure release system is employed for releasing the spring actuated portion of the brake. This brake may, therefore, function as a combined service and parking brake with the spring applied portion serving as the parking brake.

12 Claims, 3 Drawing Figures

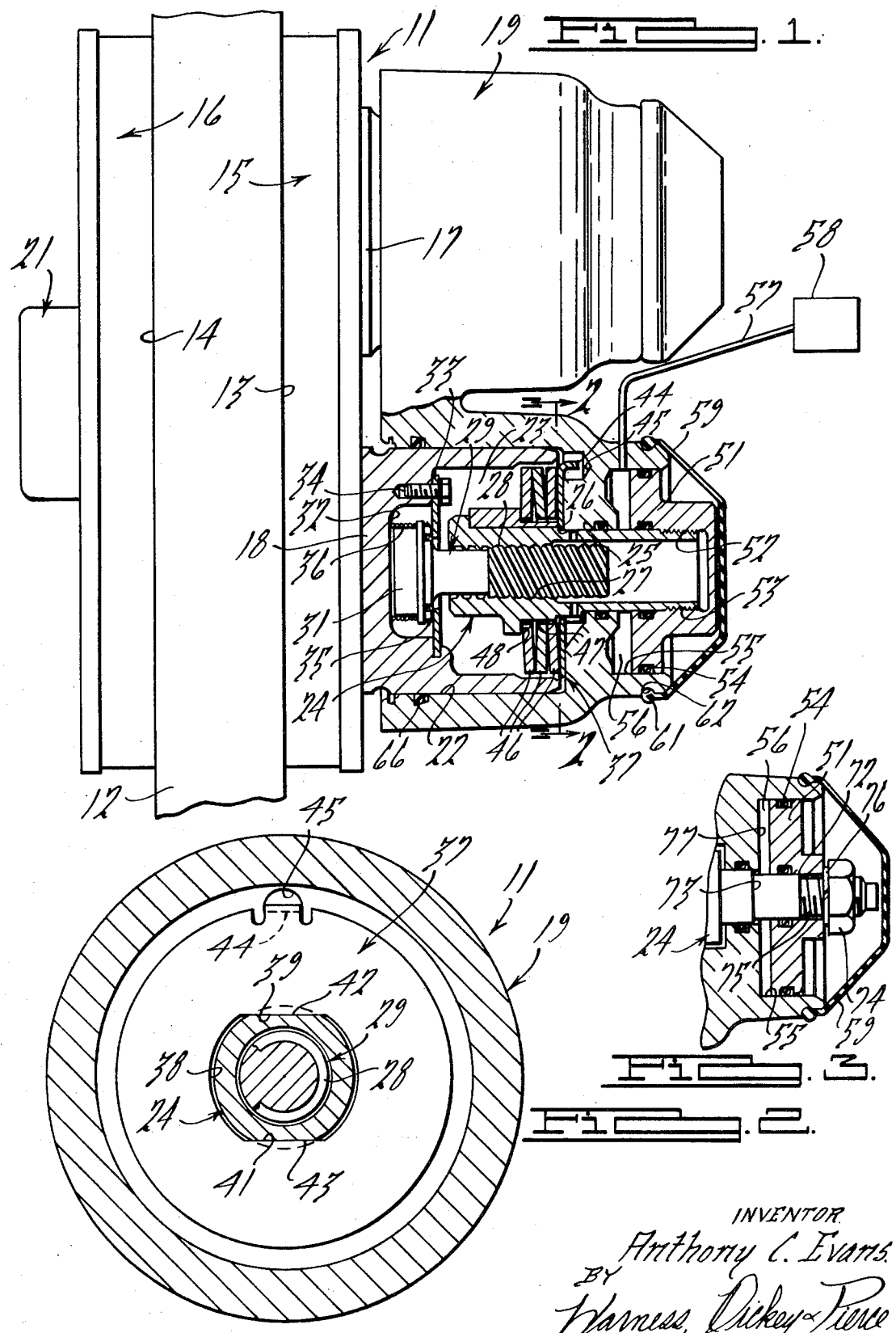

COMBINED SERVICE AND PARKING BRAKE

BACKGROUND OF THE INVENTION

This invention relates to a brake system for a self-propelled vehicle and more particularly to a combined parking and service brake.

One way in which a brake assembly may function as a combined parking and service brake is to add a spring applying device to actuate the brake during parking operation. With such a brake arrangement, it is necessary to employ a release system for relieving the brake of the spring force during normal braking operation. Although such brakes have been proposed, the previously suggested combined parking and service brakes with spring application have been complicated and expensive. In addition, such brakes have not permitted the incorporation of devices for automatically compensating for lining wear.

It is, therefore, a principal object of this invention to provide an improved and simplified brake assembly that may be applied both hydraulically and by means of spring pressure.

It is another object of this invention to provide a combined spring and fluid pressure applied brake incorporating an automatic adjusting mechanism.

Although all motor vehicles are equipped with parking brakes, most operators rarely use the parking brake. Generally, the operator relies upon the use of the transmission to prevent the vehicle from rolling when it is not being operated. That is, when the vehicle is parked, the operator generally leaves the transmission in gear or in a special parking range provided for this purpose. Doing so without applying the parking brake places a considerable strain on the transmission and affords no safety factor in the event the transmission or drive train should break.

It is, therefore, another object of this invention to provide a brake system for a motor vehicle that automatically engages when the vehicle is not being driven.

SUMMARY OF THE INVENTION

This invention is adapted to be embodied in a disk brake assembly. The brake assembly includes a housing that defines a bore and a piston that is slidably supported within the bore and which is adapted to cooperate with a brake pad for bringing the brake pad into frictional engagement with an associated rotor. The bore of the housing is adapted to be exposed to fluid pressure for actuating the piston. Biasing means have an operative connection to the piston for transmitting an actuating force upon the piston from the biasing means. Released means are provided for relieving the piston from the actuating force of the biasing means for normal fluid pressure operation of the brake. Automatic adjusting means are provided in the operative connection between the biasing means and the piston for adjusting the at rest position of the piston when the piston is not actuated by the biasing means or by fluid pressure in the bore.

Another feature of the invention is adapted to be embodied in a compact disk brake assembly. Such an assembly includes a housing that defines a bore and a piston that is slidably supported within the bore. The bore is adapted to be exposed to fluid pressure for actuating the piston and bringing an associated brake pad into frictional engagement with a rotor. Spring means are nested within the piston and have an operative connection with the piston and with the housing for exerting an actuating force upon the piston. Release means are provided for relieving the piston of the actuating force of the spring means.

Still a further feature of this invention is adapted to be embodied in a brake system for a self-propelled vehicle. The brake system includes a vehicle wheel brake having a brake shoe for braking the rotation of a vehicular wheel. A primary brake actuating system is provided for normally actuating the brake shoe. Parking brake means responsive to the cessation of operation of the vehicle engine are provided for applying the brake shoe when the vehicle engine ceases to operate. Means are additionally provided that are responsive to the operation of the vehicle engine for disabling the parking brake means whereby the brake shoe may be normally operated by the primary brake actuating system.

BRIEF DESCRIPTION OF THE DRAWINGS

FIG. 1 is a plan view, with a portion broken away, of a vehicle wheel brake embodying this invention and showing a portion of the system in schematic form.

FIG. 2 is an enlarged cross-sectional view taken along the line 2—2 of FIG. 1.

FIG. 3 is a cross-sectional view, in part similar to FIG. 1, showing another embodiment of the invention.

DETAILED DESCRIPTION OF THE PREFERRED EMBODIMENTS

This invention is adapted to be embodied in a self-propelled motor vehicle such as an automobile. The invention may be applied to at least two of the vehicle wheel brakes, one of which is shown in FIG. 1 and is identified generally by the reference numeral 11. The brake 11 is of the disk type embodying a dual piston, sliding caliper arrangement which may be of any known type except as hereafter noted. The brake 11 includes a rotor 12 that is affixed for rotation with a vehicular wheel (not shown) and which defines oppositely facing braking surfaces 13 and 14. A pair of brake pads 15 and 16 is disposed adjacent the rotor braking surfaces 13 and 14, respectively. The brake pad 15 is engaged by a pair of pistons 17 and 18 that are carried by a caliper assembly indicated generally by the reference numeral 19 in a manner which will become more apparent as this description proceeds. The caliper assembly 19 includes a leg 21 that is engaged with the brake pad 16. As is well known with the sliding caliper type of disk brake, when the pistons 17 and 18 are actuated, the caliper 19 will slide and the leg 21 will exert an applying force against the brake pad 16.

The actuating structure and each of the pistons 17 and 18 are identical in construction and, therefore, only the structure associated with the piston 18 will be described in detail. The caliper 19 is formed with a bore 22 in which the piston 18 is slidably received and with which the piston 18 defines a fluid chamber 23. The chamber 23 is adapted to be selectively applied with fluid under pressure from a master cylinder (not shown) for actuating the piston 18.

An internally threaded sleeve, indicated generally by the reference number 24, has a cylindrical portion 25 that is slidably received in a bore 26 formed in the caliper 19 at the base of the bore 22. The sleeve 24 has internal threads 27 that are engaged with threads 28 of an adjusting member 29. The adjusting member 29 has an enlarged head portion 31 that is juxtaposed to a rear wall 32 of the piston 18. The adjusting member 29 is located axially with respect to the piston 18 by means of a collar 33 that is affixed to the piston 18 by means of screws 34 (only one of which appears in the drawings). An anti-friction thrust bearing 35 is interposed between the collar 33 and the adjusting member headed portion 31. A torsional spring 36 encircles the headed portion 31 and is affixed to one of its ends to the piston 18 which acts as a one way clutch between the piston 18 and the adjusting member 29.

The sleeve 24 is held against rotation by means of a washer 37. The washer 37 has an opening 38 which is defined in part by a pair of flats 39 and 41 (FIG. 2) that engage cooperating flats 42 and 43 formed on the sleeve 24 at one end of the cylindrical portion 25. The washer 37 is formed with a tang 44 that is received in a drilled hole 45 formed with a tang 44 that is received in a drilled hole 45 formed in the caliper 19 at the base of the bore 22.

A plurality of Belleville springs 46 is nested within the piston 18 and encircles a circular portion 47 of the sleeve 24 formed adjacent the flats 39 and 41. The Belleville springs 46 bear against a shoulder 48 formed on the sleeve 24 and against the caliper 19 at the base of the bore 22 through the washer 37. Thus, the Belleville springs 46 exert a bias on the sleeve 24 that tends to urge the sleeve 24 and adjusting member 29 toward the rotor braking surface 13.

An auxiliary piston 51 is formed with a tapped opening 52 that is threaded onto a male threaded section 53 formed at the other end of the sleeve 24. The auxiliary piston 51 carries an O-ring seal 54 that slidably engages a bore 55 formed in the caliper 19 concentrically with the bore 22. The bore 55 forms with the piston 51 a fluid chamber 56. The chamber 56 is adapted to receive a fluid under pressure, for a reason which will become more apparent as this description proceeds. The chamber 56 may be pressurized in one of several different methods, as will be described. For the sake of illustration a conduit 57 extends from a source of fluid under pressure, indicated schematically at 58 to the chamber 56. A dust seal 59 has a bead 61 that is received in a groove 62 formed at the outer periphery at the caliper 19 and adjacent the bore 55. The dust seal 59 encircles the auxiliary piston 51 and protects it from contamination.

OPERATION

The brake assembly 11 is adapted to be actuated hydraulically through pressurization of the bore 22 for normal service brake operation. In addition, the brake assembly 11 may be spring applied, by means of the Belleville springs 46 for parking brake application. To release the parking brake, the chamber 56 is pressurized. This pressurization may be obtained in any suitable manner. For example, the pressure that is transmitted to the chamber 56 may be derived from an engine driven pump and in a circuit that includes an accumulator. In order to apply the parking brake, the pressure in the chamber 56 is relieved so that the springs 46 may actuate the pistons 17 and 18, as will be described. One way in which the brake assembly 11 may be used will achieve automatic parking brake operation. In such a system, the pressure source 58 may comprise a pump that is driven by the engine so that it will generate a pressure at all times the engine is running.

The drawings illustrate the brake assembly 11 as it appears when the vehicle engine is not running. Under this condition, there is substantially no fluid pressure in the chamber 56 and the Belleville washers 46 acting through the sleeve 24 and adjusting member 29 urge the pistons 17 and 18 toward the rotor braking surface 13. This force is sufficient to hold the brake pad 15 in frictional engagement with the rotor braking surface 13. At the same time, a reactive force is exerted upon the caliper 19 that causes it to shift and move the leg 21 toward the rotor braking surface 14. This force is transmitted to the brake pad 16 to bring it into frictional engagement with the rotor braking surface 14. Hence, the brake pads 15 and 16 will be held in tight frictional engagement with the respective rotor braking surfaces and will hold the rotor 12 against rotation. The one way clutch between the piston 18 and adjusting member 29 precludes any rotation of the adjusting member 29 when the springs 46 apply the brake.

When the engine of the associated vehicle is in operation, the engine driven auxiliary pump 58 will deliver fluid under pressure through the conduit 57 to the chamber 56. This pressurization will be sufficient to urge the auxiliary piston 51 away from the rotor braking surface 15. Since the auxiliary piston 51 is connected to the sleeve 24, the sleeve 24 and the adjusting member 29 will be moved away from the rotor braking surface 13. The movement of the adjusting member headed portion 31 is transmitted through the thrust bearing 35 and washer 33 to the pistons 17 and 18. During this action the Belleville springs 46 are compressed and the force that they previously exerted on the caliper 19 is overcome by the pressure in the chamber 56. Hence, when the engine is running, the brake pads 15 and 16 only have light rubbing contact with the rotor 12 as is well known in this art.

When it is desired to operate the brake assembly 11, the fluid chamber 23 is pressurized in any known manner. This pressure acting on the pistons 17 and 18 causes them to shift toward the rotor braking surface 13. The brake pads 15 and 16 will then be applied to the rotor braking surface 13 and 14. When the fluid pressure in the chamber 23 is relieved, a seal 66 positioned around the bore 22 acts on the piston 18 to release it, as is well known in this art. An axial clearance exists between the trapped, adjusting member headed portion 31 and the piston 18 to permit normal actuation and release of the piston 18.

In the event there has been more than a predetermined degree of lining wear on the brake pads 15 and 16, which degree of permissible wear is determined by the aforenoted clearance, the adjusting member 29 will be adjusted upon actuation of the piston 18. When the brake pads are applied by pressurizing the chamber 23 and adjustment is required, a force will be exerted on the adjusting member 29 that causes it to rotate. This rotation is permitted by the spring clutch 36. Since the sleeve 24 is held against rotation, an adjustment will be made in the at rest position of the member 29. When the pressure in the chamber 23 is relieved, the pistons 17 and 18 will be retracted by the seals 66 interposed between the bore 22 and the pistons 17 and 18 to the new at rest position determined by the position of the adjusting member 29. Thus, adjustment of the at rest position of the brake assembly is accomplished automatically.

In the described embodiment, the brake assembly 11 was automatically engaged when the engine was not running. Under some conditions it may be desired to permit release of the brake when the engine is not running. Such an arrangement is shown in the embodiment illustrated in FIG. 3. Except for the structure to be described, this embodiment is the same as the embodiment of FIG. 1 and FIG. 2 and the description of the overall construction will not be repeated.

In this embodiment, the sleeve 24 has a reduced diameter portion 72 that extends through a bore 73 in the auxiliary piston 51. A nut 74 is received on a threaded end 75 of the sleeve portion 72. The piston 51 is normally held against a washer 76 that is interposed between the piston 51 and the nut 74. Thus, when the chamber 56 is pressurized, the motion transmitted to the piston 51 will be transmitted through the nut 74 and washer 76 to the sleever 24. Also, when the Belleville washers act on the sleeve 24, this motion will be transmitted through the nut 74 and washer 76 to the piston 51. The brake pads in this embodiment are operated in the same manner as previously described.

FIG. 3 illustrates the brake with the engine not running and the brake applied by the Belleville washers 46. If it is desired to release the brakes, the nut 74 is turned so that it will advance on the thread 75 and urge the piston 51 to the left as viewed in FIG. 3. This movement is continued until the piston 51 abuts a wall 77 of the caliper 19. At this time, further movement of the piston 51 is precluded. Continued rotation of the nut 74 will cause the sleeve 24 to move to the right as viewed in this figure. This movement is transmitted through the adjusting member 29 to the pistons 17 and 18 with a resulting release of the brake pads 15 and 16.

The operation of the embodiments of FIGS. 1 and 2 and FIG. 3 has been described in connection with an automatically applied parking brake. As has been previously noted, the parking brake may be applied in other manners than automatically. For example, an engine driven pump or an electrical pump may charge the system 58 and provide the pressure for actuating the auxiliary piston 51. The pressure in the chamber 56 may be relieved to cause spring application at the desired times, in any known manner.

It is to be understood that the foregoing description is that of preferred embodiments of the invention. Various changes and modifications may be made without departing from the spirit and scope of the invention as defined by the appended claims.

I claim:

1. A disk brake assembly comprising a housing defining a bore, a piston slidably supported within said bore, said bore being adapted to be exposed to fluid pressure for actuating said piston to bring an associated brake pad into frictional engagement with a rotor, spring means nested within said piston, said spring means having an operative connection with said piston and said housing for exerting an actuating force upon said piston, and release means for relieving said piston from the actuating force of said spring means for normal fluid pressure operation of said brake assembly.

2. A disk brake assembly as set forth in claim 1, wherein the operative connection between the spring means and the piston includes automatic adjusting means for adjusting the at rest position of said piston.

3. A disk brake assembly as set forth in claim 2, wherein the automatic adjusting means includes a threaded connection, the operative connection between the spring means and the piston including an adjusting member having a lost motion connection with said piston.

4. A disk brake assembly as set forth in claim 1, wherein the release means comprises a fluid operated piston.

5. A disk brake assembly as set forth in claim 4, wherein the fluid operated piston of the release means is supported within a second bore in the housing concentric and spaced from the first bore.

6. A disk brake assembly including a rotor having a braking surface, a brake pad juxtaposed to said rotor and adapted to frictionally engage said rotor braking surface, a caliper defining a cylindrical bore, a piston slidably supported in said cylindrical bore and adapted to operate said braking pad for bringing said brake pad into frictional engagement with said rotor braking surface, an adjusting member operatively associated with said piston and having a threaded portion, a threaded member matingly engaged with said threaded portion of said adjusting member, a spring means interposed between said caliper and said threaded member for urging said threaded member, said adjusting member and said piston to a brake pad applying position, an auxiliary piston affixed to said threaded member, means for applying fluid pressure to said auxiliary piston for moving said threaded member and compressing said spring means for precluding spring application of said brake pad, and means for manually relieving the force applied by said spring means to said piston for preventing spring actuation of the brake pad.

7. A disk brake assembly as set forth in claim 6 wherein the means for manually relieving the force exerted by the spring means includes a threaded member engageable with an abutment.

8. A disk brake assembly as set forth in claim 6 wherein the means for manually relieving the force of the spring means includes means for exerting an axial force on the threaded member in opposition to the force exerted thereupon by the spring means.

9. A disk brake assembly as set forth in claim 6 further including manually operable release means for relieving the force exerted by the spring means upon the piston.

10. A disk brake assembly as set forth in claim 6 wherein the spring means comprise a plurality of Belleville springs.

11. A disk brake assembly as set forth in claim 10 wherein the automatic adjusting means includes a female threaded member extending from the first bore to the second bore, the fluid operated piston of the release means being connected to said female threaded member and the Belleville spring means encircling said female threaded member.

12. A disk brake assembly for providing hydraulic and automatic spring operation of a brake pad comprising a first fluid motor having a first piston operatively associated with the brake pad for actuating the brake pad, spring means operatively associated with the brake pad for automatically applying the brake pad, a second fluid motor having a second fluid piston operatively associated with said spring means for relieving the actuating force exerted by the spring means on the brake pad in response to the application of fluid pressure thereto, and means for manually relieving the pressure exerted by the spring means on the brake pad for releasing the brake pad manually upon failure of the second fluid motor.

* * * * *